United States Patent
Bothe et al.

(10) Patent No.: US 7,412,012 B2
(45) Date of Patent: Aug. 12, 2008

(54) PATTERN SEQUENCE SYNCHRONIZATION

(75) Inventors: Harald Bothe, Castrop-Rauxel (DE); Dirk Gaschler, Wermelskirchen (DE)

(73) Assignee: Nokia Corporation, Espoo (FI)

( * ) Notice: Subject to any disclaimer, the term of this patent is extended or adjusted under 35 U.S.C. 154(b) by 946 days.

(21) Appl. No.: 10/657,078

(22) Filed: Sep. 9, 2003

(65) Prior Publication Data

US 2005/0008089 A1    Jan. 13, 2005

(30) Foreign Application Priority Data

Jul. 8, 2003   (EP) .................................. 03015374

(51) Int. Cl.
*H04L 27/06*   (2006.01)
(52) U.S. Cl. .................................................. 375/343
(58) Field of Classification Search ................ 375/150, 375/343, 364, 329, 365, 266, 368; 370/491, 370/503; 455/404.2; 700/206; 704/219; 73/602
See application file for complete search history.

(56) References Cited

U.S. PATENT DOCUMENTS

| | | | |
|---|---|---|---|
| 4,477,912 A | | 10/1984 | Russell |
| 5,272,923 A | * | 12/1993 | Wadaka et al. ................. 73/602 |
| 5,548,293 A | * | 8/1996 | Cohen .................... 342/357.11 |
| 5,644,591 A | | 7/1997 | Sutton |
| 5,963,896 A | * | 10/1999 | Ozawa ........................ 704/219 |
| 6,466,840 B1 | * | 10/2002 | Schoch ........................ 700/206 |
| 6,546,256 B1 | * | 4/2003 | Maloney et al. ........... 455/404.2 |
| 6,853,678 B2 | * | 2/2005 | Hasegawa et al. ............ 375/150 |
| 7,003,056 B2 | * | 2/2006 | Chen .......................... 375/343 |
| 2003/0179776 A1 | * | 9/2003 | Sumasu et al. .............. 370/491 |
| 2006/0126670 A1 | * | 6/2006 | Jeon et al. .................... 370/503 |

FOREIGN PATENT DOCUMENTS

| | | |
|---|---|---|
| EP | 1005204 A2 | 5/2000 |
| WO | WO0077961 | 12/2000 |

\* cited by examiner

*Primary Examiner*—Don N Vo
(74) *Attorney, Agent, or Firm*—Squire Sanders & Dempsey L.L.P.

(57) ABSTRACT

A synchronization that includes a pattern sequence. In the synchronization, symbols of a first pattern sequence are usually correlated, the symbols commonly including amplitude and/or phase information, thereby routinely obtaining a first differential phase information sequence, symbols of a second pattern sequence are correlated, the symbols generally including amplitude and/or phase information, thereby typically obtaining a second differential phase information sequence, and then the first and second differential phase information sequences are usually correlated, thereby obtaining a correlation result. Then, a synchronization between the first and second pattern sequences is often determined on the basis of the obtained correlation result.

28 Claims, 9 Drawing Sheets

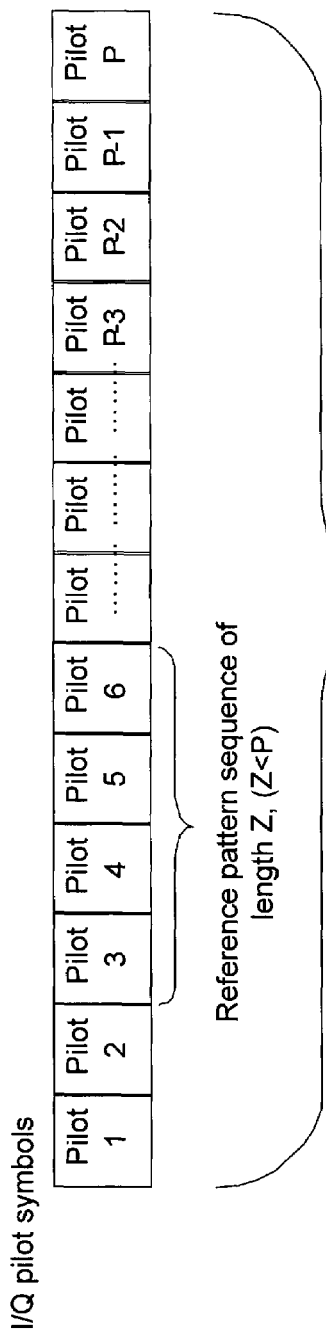
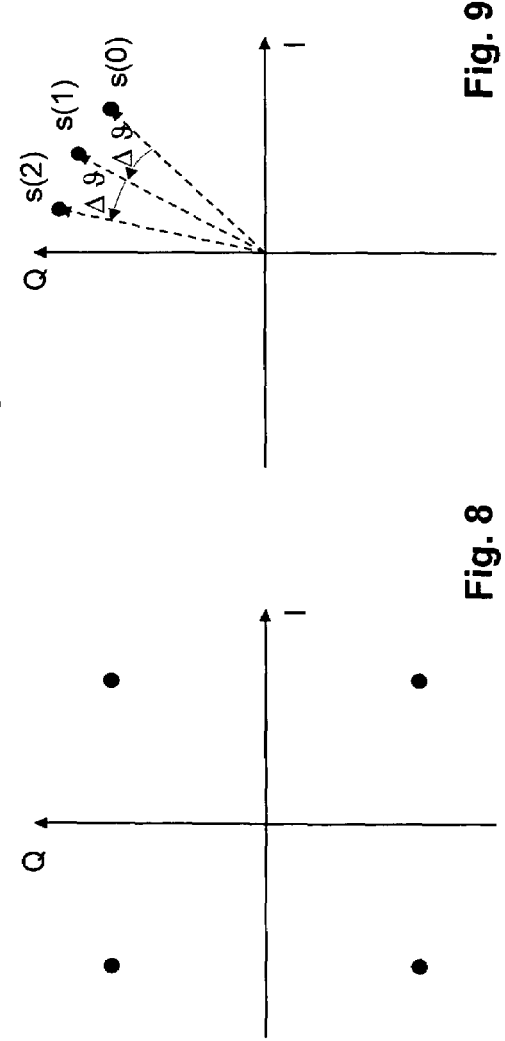
Fig. 7
Fig. 8
Fig. 9

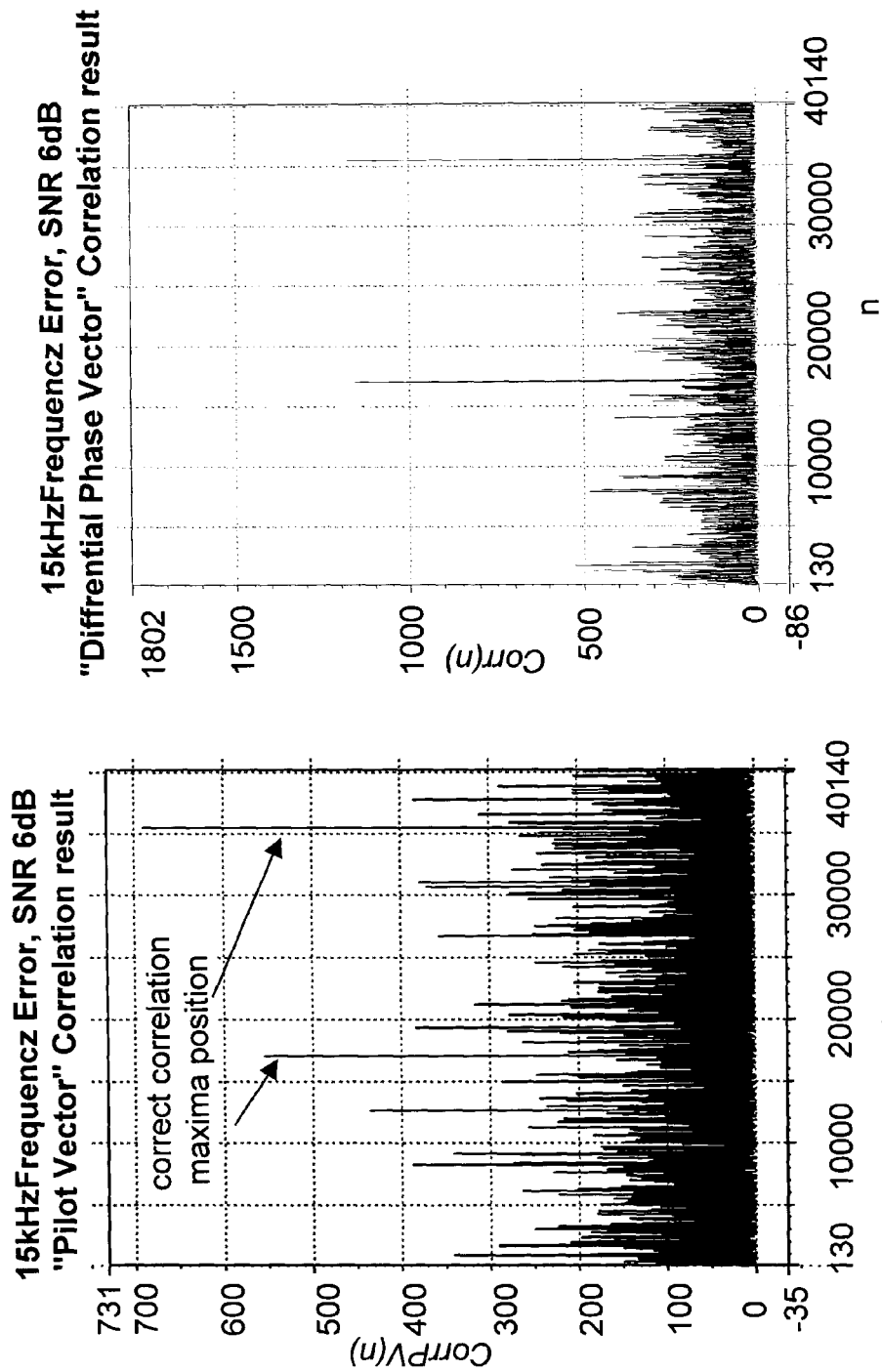

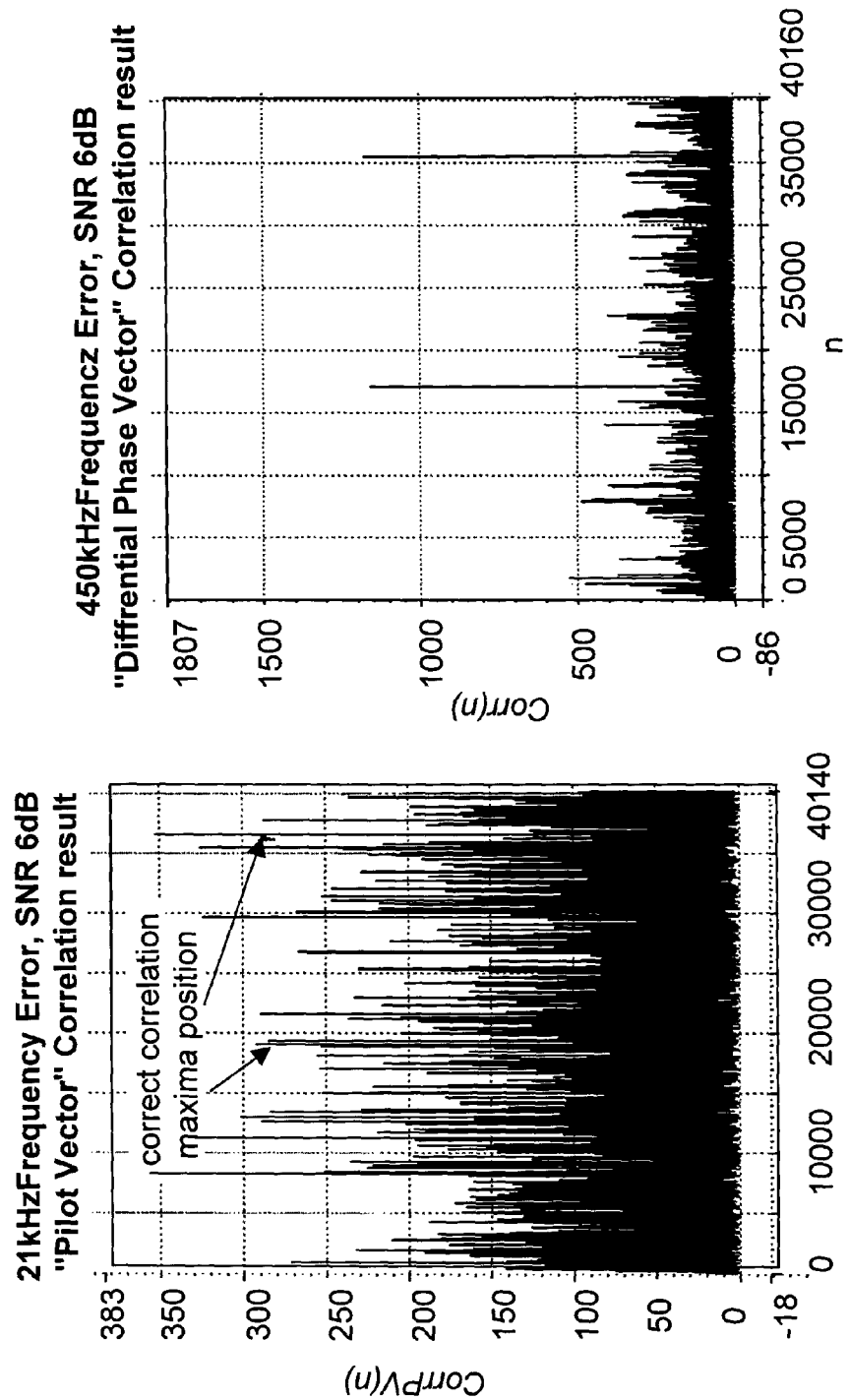

PATTERN SEQUENCE SYNCHRONIZATION

BACKGROUND OF THE INVENTION

1. Field of the Invention

The present specification relates generally to a method and an apparatus for pattern sequence synchronization between a first and a second pattern sequence. Certain embodiments discussed in the present specification relate to a synchronization between a received pattern sequence which may, for example, be generated at a transmitting device and a reference pattern sequence of a receiving device. Certain embodiments are applicable in single carrier transceivers with frame synchronization for pilot detection, in single carrier quadrature direct conversion transceivers for single carrier detection, and/or in OFDM (Orthogonal Frequency Division Multiplexing) systems for finding training sequences.

2. Description of the Related Art

Frame synchronization is often used to enable further blocks and/or error correction loops in a receiver chain. The reference pattern sequence, usually known at the receiver and typically synchronized by a pilot detection and synchronization scheme, generally gives necessary information to receiver data aided error detector loops, normally for improving the receiver performance.

In continuous transmission based systems, it is often necessary to have an extremely signal distortion tolerant architecture. One of the major errors is the transmitter/receiver carrier-frequency mismatch.

Synchronization of a reference pilot symbol sequence with a pilot symbol sequence in received data is generally done, according to the related art, by correlation of IQ symbols of the received pattern sequence with the reference pattern sequence of pilot symbols. Such a procedure is also typically called a Pilot Vector (PV) correlation procedure.

In the following description of the conventional PV correlation procedure, it is generally assumed that there is no frequency mismatch between the transmitter and the receiver.

The correlation is usually running permanently on the received pilot symbols. For each received pilot symbol s(n), the correlation is commonly done on the last "Z" received symbols (s(n) . . . s(n−Z)), normally with reference pilot symbols (r(1) . . . r(Z)).

$$s(n) = s_I(n) + js_Q(n) = |s(n)| \cdot e^{j\varphi_s(n)}; r(k) = r_I(k) + jr_Q(k) = |r(k)| \cdot e^{j\varphi_r(k)};$$

$$corr_{PV}(n) = \sum_{k=1}^{Z} s(n-k) \cdot r*(Z-k)$$

$$corr_{PV}(n) = \sum_{k=1}^{Z} |s(n-k)| \cdot |r(Z-k)| \cdot e^{j(\varphi_s(n-k)-\varphi_r(Z-k))}$$

Z: Search Sequence Length

Assuming no imperfections, if the reference pattern sequence matches with the received pattern sequence of pilot symbols and "|s(n)|=|r(k)|=a", the correlation output $corr_{PV}$ normally results to:

$$corr_{PV}(n) = \sum_{k=1}^{Z} a \cdot a \cdot e^{j(0)} = Z \cdot a^2$$

The analog stages of a transceiver system typically introduce unwanted imperfections such as, but not limited to, transmitter/receiver carrier-frequency and/or phase mismatch. Normally, the higher the carrier-frequency, the higher the impact to transmitter and/or receiver carrier-frequency mismatch will be. For example, during the system start-up process, an extended mismatch is usually expected. The receiver commonly has to be able to detect and/or correct these effects in the widest range possible. The carrier-frequency mismatch is typically seen as an incremental phase shift (nΔθ) on received IQ symbols s(n).

$$s(n)=|s(n)| \cdot e^{j\varphi_s(n)} \cdot e^{j \cdot n \cdot \Delta\theta}$$

The conventional method according to the related art is usually to correlate the received IQ symbol pattern sequence with a reference pattern sequence of pilot symbols. This approach is normally rather sensitive to carrier-frequency mismatch because each correlation product is generally infected by the mismatch seen as IQ symbol rotation (0 . . . nΔθ). The correlation products commonly calculated over the complete pattern sequence length are normally summed up. Finally, the impact of the carrier frequency mismatch usually distorts the correlation result significantly.

As mentioned above, a carrier mismatch typically has a significant effect to the above-described pattern sequence correlation. In case the carrier mismatch exceeds a certain range the correlation normally does not deliver the necessary periodic maximum peaks. Consequently, the exact position of the pilot sequence and/or the framing will generally not be found. Furthermore, frame-dependent working blocks, as well as detection blocks, which usually work on reference and/or received pilot symbols, will commonly not get the necessary inputs. Even further, the receiver often does not get into the "lock" status, as the pilot sequence is generally not found.

In other words, if the conventional frame synchronization method is used, the digital receiver is commonly unable to start-up above a threshold of mismatch. The related art correlation-based frame synchronization techniques typically tolerate this carrier-frequency offset only up to a certain limit, since the impact of the carrier frequency mismatch normally distorts the correlation result significantly.

SUMMARY OF THE INVENTION

It is therefore an object of certain embodiments of the present invention to increase the tolerable range of carrier-frequency mismatch.

According to certain embodiments of the present invention, this object may be, for example, achieved by the methods, apparatuses, systems, and/or computer programs discussed herein and recited in the claims.

Certain embodiments of the present invention use differential phase information, commonly included in a pattern sequence of symbols for correlation. Compared with related art techniques, the following advantages may be achieved:

- at a digital receiver input, a much higher carrier-frequency mismatch is generally tolerable, up to which the pilot detection is able to work;
- in the pattern sequence synchronization, as one result of the correlation, the constant carrier-frequency mismatch is typically obtained;
- a pilot symbol generation at the receiver is usually improved;
- fast carrier-frequency and/or phase error detectors normally work on worse mismatch ranges, which can commonly be derived directly out of the correlation procedure according to certain embodiments of the present invention; and detectors working on received and reference pilot symbols often get improved inputs at a worse carrier mismatch.

According to certain embodiments of the present invention, a method of synchronizing with a pattern sequence is provided. The method typically includes a first correlation step of correlating symbols of a first pattern sequence, the symbols normally including amplitude and phase information, thereby commonly obtaining a first differential phase information sequence, a second correlation step of correlating symbols of a second pattern sequence, the symbols usually including amplitude and phase information, thereby generally obtaining a second differential phase information sequence, a third correlation step of correlating the first and second differential phase information sequences, thereby typically obtaining a correlation result, and a step of determining a synchronization between the first and second pattern sequences, usually on the basis of the obtained correlation result.

According to certain other embodiments, an apparatus for synchronizing with a pattern sequence is provided. The apparatus normally includes a first correlation means, generally for correlating symbols of a first pattern sequence, the symbols commonly including amplitude and/or phase information, and typically outputting a first differential phase information sequence, a second correlation means, normally for correlating symbols of a second pattern sequence, the symbols often including amplitude and/or phase information, and generally outputting a second differential phase information sequence, a third correlation means, usually for correlating the first and second differential phase information sequences, and normally outputting a correlation result, and a means for determining a synchronization between the first and second pattern sequences, typically on the basis of the correlation result.

According to yet other embodiments, a system for synchronizing with a pattern sequence is provided. The system usually includes a transmitting device which itself often includes a means for generating symbols of a pattern sequence to be used for synchronization, and transmitting means for transmitting the symbols of the pattern sequence. The system generally also includes a receiving device which itself typically includes first correlation means for correlating symbols of a reference pattern sequence, the symbols usually including amplitude and/or phase information, and normally outputting a first differential phase information sequence, receiving means for receiving the symbols of the pattern sequence transmitted by the transmitting device, second correlation means for correlating the received symbols of the pattern sequence, the symbols commonly including amplitude and/or phase information, and generally outputting a second differential phase information sequence, third correlation means for correlating the first and second differential phase information sequences, and typically outputting a correlation result, and means for determining a synchronization between the received and reference pattern sequences on the basis of the correlation result.

According to other embodiments, a computer program product is provided. This computer program generally includes software code portions for performing a method when the product is run on a computer. The method commonly includes a first correlation step of correlating symbols of a first pattern sequence, the symbols usually including amplitude and/or phase information, thereby obtaining a first differential phase information sequence, a second correlation step of correlating symbols of a second pattern sequence, the symbols normally including amplitude and/or phase information, thereby obtaining a second differential phase information sequence, a third correlation step of correlating the first and second differential phase information sequences, thereby generally obtaining a correlation result, and a step of determining a synchronization between the first and second pattern sequences on the basis of the obtained correlation result.

According to yet other embodiments of the present invention, a system for synchronizing with a pattern sequence is provided. The system usually includes a transmitting device which itself normally includes a symbol generator for generating symbols of a pattern sequence to be used for synchronization, and a transmitter for transmitting the symbols of the pattern sequence. The system often also includes a receiving device which generally includes a first processor for correlating symbols of a reference pattern sequence, the symbols typically including amplitude and/or phase information, and usually outputting a first differential phase information sequence, a receiver for receiving the symbols of the pattern sequence transmitted by the transmitting device, a second processor for correlating the received symbols of the pattern sequence, the symbols normally including amplitude and/or phase information, and commonly outputting a second differential phase information sequence, a third processor for correlating the first and second differential phase information sequences, and generally outputting a correlation result and a fourth processor for determining a synchronization between the received and reference pattern sequences on the basis of the correlation result.

BRIEF DESCRIPTION OF THE DRAWINGS

For proper understanding of certain embodiments of the present invention, reference should be made to the accompanying drawings, wherein:

FIG. 7 shows a representative pattern sequence of pilot symbols, including a reference pattern sequence;

FIG. 8 shows an exemplary constellation diagram illustrating typical ideal QPSK modulated pilot symbol positions;

FIG. 9 shows a representative constellation diagram illustrating common rotated pilot symbol positions due to a carrier-frequency mismatch;

FIGS. 13 to 18 show representative simulation results.

DETAILED DESCRIPTION OF THE PREFERRED EMBODIMENT(S)

Figure 1:
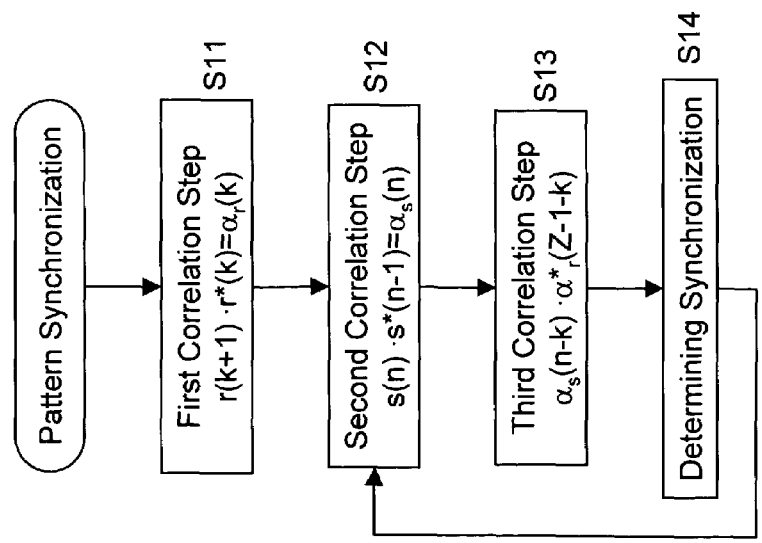
FIG. 1 shows a representative flow diagram illustrating a common method of synchronizing with a pattern sequence according to certain embodiments of the present invention.

FIG. 1 shows a flow diagram illustrating a representative method of synchronizing a first pattern sequence and a second pattern sequence according to certain embodiments of the present invention. In step S11, symbols $r(k)=r_I(k)+jr_Q(k)$ of a first pattern sequence are correlated, which first correlation step yields a first differential phase information sequence $\alpha_r(k)$. In step S21, symbols $s(n)=s_I(n)+js_Q(n)$ of a second pattern sequence are correlated, which second correlation step yields a second differential phase information sequence $\alpha_s(n)$. In step S13, the first and second differential phase information sequences are correlated, which third correlation step yields a correlation result $corr_{DPV}(n)$. Then, in step S14, a synchronization between the first and second pattern sequences is determined, usually on the basis of the obtained correlation result.

Figure 2:
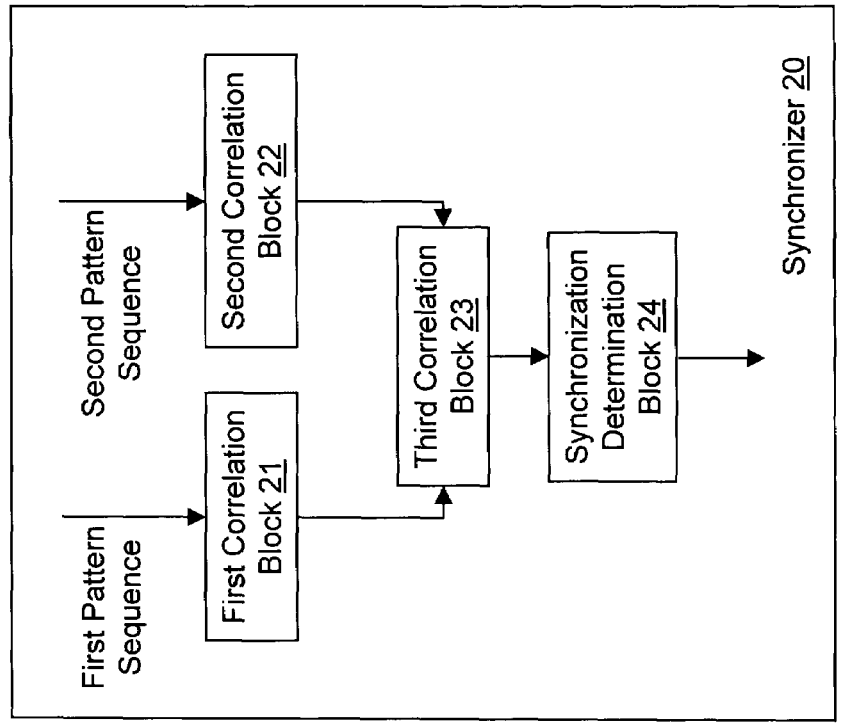
FIG. 2 shows an exemplary schematic block diagram illustrating a typical apparatus for synchronizing with a pattern sequence according to certain embodiments of the present invention.

FIG. 2 shows a block diagram illustrating a commonly used synchronizer 20, commonly for synchronizing two pattern sequences according to certain embodiments of the present invention. The synchronizer 20 usually includes at least a first correlation block 21, normally for correlating symbols $r(k)=r_I(k)+jr_Q(k)$ of a first pattern sequence and/or outputting a first differential phase information sequence $\alpha_r(k)$, a second correlation block, typically for correlating symbols $s(n)=s_I(n)+js_Q(n)$ of a second pattern sequence and/or outputting a second differential phase information sequence $\alpha_s(n)$, a third correlation block 23, normally for correlating the first and/or second differential phase information sequences and/or outputting a correlation result $corr_{DPV}(n)$, and a block 24, usually for determining a synchronization between the first and second pattern sequences, generally on the basis of the correlation result.

One of the aims of the above-described correlation technique is often to find the absolute position of the first pattern sequence in the second pattern sequence. The correlation technique is commonly based on the use of the differential phase information and/or differential phase vector (DPV) sequences. The DPV $\alpha_s$ is normally calculated out of a symbol $s(n)$ of the second pattern sequence, which may be a currently received symbol $s(n)$, and a previous symbol $s(n-1)$ of the second pattern sequence. The DPV $\alpha_r(k)$ of the first pattern sequence is generally calculated out of a symbol $r(k+1)$ and a symbol $r(k)$.

$$\alpha_s(n)=s(n)\cdot s^*(n-1)=|s(n)|\cdot|s(n-1)|\cdot e^{j(\phi_s(n)-\phi_s(n-1))};$$

$$\alpha_r(k)=r(k+1)\cdot r^*(k)=|r(k+1)|\cdot|r(k)|\cdot e^{j(\phi_r(k+1)-\phi_r(k))}; \quad (4)$$

with $$\Delta\phi_s=(\phi_s(n)-\phi_s(n-1));$$

$$\Delta\phi_r=(\phi_r(n)-\phi_r(n-1));$$

The number of first DPVs is one commonly less than a length Z of the first pattern sequence of symbols.

$$corr_{DPV}(n) = \sum_{k=1}^{Z-1} \alpha_s(n-k) \cdot \alpha_r*(Z-1-k); \quad (5)$$

$$corr_{DPV}(n) = \sum_{k=1}^{Z-1} |\alpha_s(n-k)| \cdot |\alpha_r(Z-1-k)| \cdot e^{j(\Delta\varphi_s(n-k)-\Delta\varphi_r(Z-1-k))}$$

The third correlation is usually done on the last "Z−1" DPVs of the second pattern sequence $(\alpha_s(n) \ldots \alpha_s(n-Z-1))$ and the first pattern sequence $(\alpha_r(Z-1) \ldots \alpha r(1))$. If it is assumed that there are no imperfections, in case that the first and second pattern sequences match, and when "$|s(n)|=|r(k)|=a$", the correlation results to:

$$corr_{DPV}(n) = \sum_{k=1}^{Z-1} a^2 \cdot a^2 \cdot e^{j(0)} = (Z-1) \cdot a^4 \quad (6)$$

Thus, as can be seen at least from the equations (3) and (6), in certain preferred and/or ideal cases, the difference between the correlation techniques of the related art and of certain embodiments of the present invention is sometimes seen as the power of "a" only.

The second and third correlation steps may run, for example, permanently on the symbols of the second pattern sequence. For each symbol $s(n)$, the second correlation is typically done on the last Z symbols $s(n) \ldots s(n-Z)$. In other words, for each repetition m, the symbols are generally shifted by one symbol, so that Z symbols 1+m to Z+m of the second pattern sequence are normally correlated two at a time.

In the case of a carrier-frequency mismatch between the symbols of the first and second pattern sequences, for example, due to a mismatch between carrier-frequencies of a transmitter transmitting the second pattern sequence and a receiver receiving the second pattern sequence from the transmitter, the PV correlation technique result according to the related art will normally decrease significantly. FIG. 8 shows highly preferable and/or ideal symbol positions, the symbols usually being QPSK (Quadrature Phase Shift Keying) modulated according to certain embodiments of the present invention. FIG. 9 shows exemplary symbol positions that have been rotated because of carrier-frequency mismatch. The mismatch $\Delta f$ is often seen on the symbols as a rotation by an incremental phase shift $\Delta\theta$ on the second pattern sequence, generally increasing symbol by symbol. In other words, in many cases, compared to $s(0)$, the rotation of $s(2)=2*\Delta\theta$.

$$\Delta f = f_{transmit} - f_{receiver}; \Delta\vartheta = \frac{\Delta f \cdot 2\pi \cdot PS}{fsymbol}; \quad (7)$$

PS: Symbol or Pilot Spacing

It generally follows for $s'(n)$ and the DPVs $\alpha'_s(n)$ of the second pattern sequence in case of a carrier mismatch:

$$s'(n)=|s(n)|\cdot e^{j\phi_s(n)} \cdot e^{jn\Delta\theta} \quad (8a)$$

$$\alpha'_s(n)=s'(n)\cdot s'^*(n-1)=|s(n)|\cdot|s(n-1)|\cdot e^{j\Delta\phi_s(n)}\cdot e^{j\Delta\theta}; \quad (8b)$$

Thus, the symbol $s'(n)$ is typically rotated by "$n\Delta\theta$" (Eq.8a) and the DPV only by $\Delta\theta$ (Eq. 8b).

For the correlation techniques according to the related art and certain embodiments of the present invention, it usually follows:

$$corr'_{PV}(n) = \sum_{k=1}^{Z} |s'(n-k)| \cdot |r(Z-k)| \cdot e^{j(\Delta\varphi_s(n-k)+(n-k)\Delta\vartheta-\Delta\varphi_r(Z-k))} \quad (9)$$

-continued $$corr'_{DPV}(n) = \sum_{k=1}^{Z-1} |\alpha'_s(n-k)| \cdot |\alpha_r(Z-1-k)| \cdot e^{j(\Delta\varphi_s(n-k)+\Delta\vartheta-\Delta\varphi_r(Z-1-k))} \quad (10)$$

In the case where pattern sequence matching is assumed and where "|s(n)|=|r(k)|=a", but where there is carrier-frequency mismatch, it normally follows:

$$corr'_{PV}(n) = \sum_{k=1}^{Z} a^2 \cdot e^{j(n-k)\cdot\Delta\vartheta} \quad (11)$$

$$corr'_{DPV}(n) = \sum_{k=1}^{Z-1} a^4 \cdot e^{j\Delta\vartheta} = e^{j\Delta\vartheta} \cdot \sum_{k=1}^{Z-1} a^4 = (Z-1) \cdot a^4 \cdot e^{j\Delta\vartheta} \quad (12)$$

Figure 11:
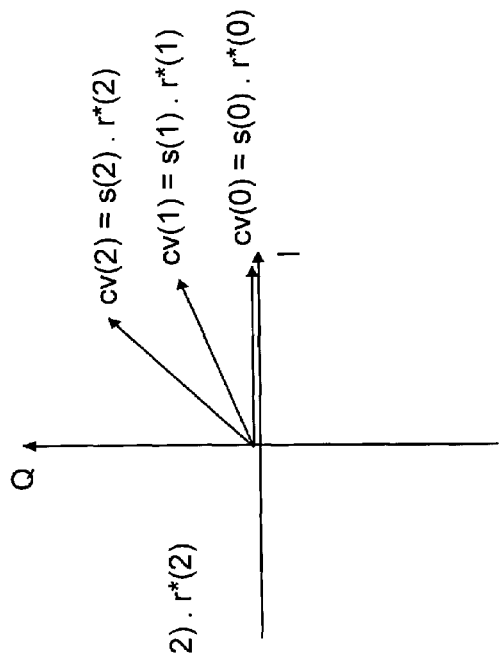
FIGS. 10 to 12 show exemplary constellation diagrams illustrating a common correlation technique according to the related art.
Figure 10:
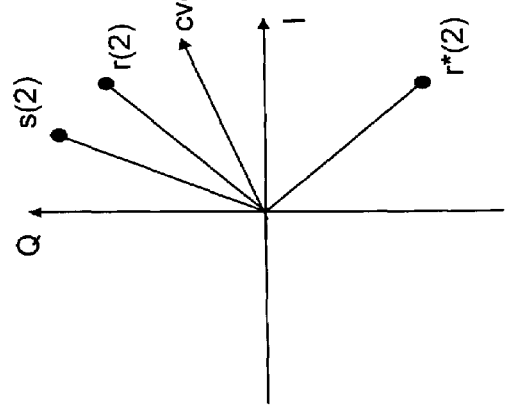
Figure 12:
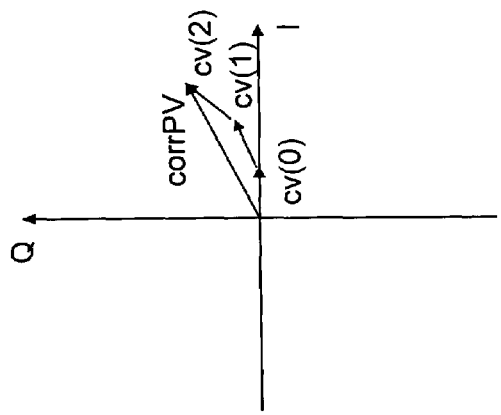

As can also generally be seen from FIGS. 10 to 12, the PV correlation result $corr'_{PV}$ is typically decreased in case of an incremental phase shift $\Delta\theta$ with respect to $corr_{PV}$ (Eq.5). Each term in the sum of $corr_{PV}$ is commonly infected by a higher phase shift. FIG. 10 shows a representative correlation product cv of first and second symbols n=2, FIG. 11 shows representative correlation products cv(0 ... 2) of three consecutive first and second pilot symbols, and FIG. 12 shows a common correlation vector $corr_{PV}$, which is typically the sum of cv(0) to cv(2).

Compared thereto, the $corr'_{DPV}$ result according to certain embodiments of the present invention with carrier-frequency mismatch is usually rotated only by one phase shift $\Delta\theta$ (Eq.6).

Because of less implementation effort, the correlation result will normally be taken as squared real plus imaginary part:

$$|corr'_{PV}(n)|^2 = \left|\sum_{k=1}^{Z} a^2 \cdot e^{j(n-k)\cdot\Delta\vartheta}\right|^2 \quad (13)$$

$$|corr'_{DPV}(n)|^2 = \left|\sum_{k=1}^{Z-1} a^4 \cdot e^{j\Delta\vartheta}\right|^2 = \left|e^{j\Delta\vartheta} \cdot \sum_{k=1}^{Z-1} a^4\right|^2 = |(Z-1) \cdot a^4 \cdot e^{j\Delta\vartheta}|^2 \quad (14)$$

$$|corr'_{DPV}(n)|^2 = (Z-1)^2 \cdot a^8$$

The impact of carrier-frequency mismatch on the Pilot Vector (PV) approach correlation result of the related art (Eq. (13)) is generally seen as a significant decrease of the possible maximum value. As shown in FIG. 11, each cv(n) is typically rotated more.

For the DPV correlation approach of certain embodiments of the present invention (Eq. (14)), the frequency error impact is often removed totally. The absolute value of the DPV correlation result is normally not changed compared to the one without carrier-frequency mismatch. In addition to this, the DPV correlation technique commonly serves as carrier-frequency error detector. It usually delivers the phase information and/or phase angle of the correlation result $corr_{DPV}$ as the constant carrier-frequency mismatch.

The symbols of the second pattern sequence may be contained in a data symbol stream and may be modulated in a different way from the data symbols in the data symbol stream and may be detected in the data symbol stream on the basis of the different modulation.

As mentioned above, the second pattern sequence may be received by a receiving device from a transmitting device, and the first pattern sequence, typically forming at least a part of the second pattern sequence, is generally known in the receiving device in which the first to third correlation steps are normally performed.

The transmitting device may include at least means for generating the symbols of the second pattern sequence and/or means for transmitting the symbols of the second pattern sequence to the receiving device. Furthermore, the transmitting device may include first modulation means, usually for modulating data of the second pattern sequence according to a first modulation scheme, thereby commonly providing the symbols of the second pattern sequence, a second modulation means for modulating payload data according to a second modulation scheme, thereby generally providing a data symbol stream, and/or means for inserting the symbols of the second pattern sequence into the data symbol stream.

In the following, certain embodiments of the present invention will be described, in which the correlation scheme is typically applied in a single carrier transceiver system, usually with frame synchronization. However, the invention is not limited to single carrier transceiver systems, but can also be applied, for example, in single carrier quadrature direct conversion transceivers for single carrier detection, and/or in OFDM systems for finding training sequences, at least in case of frequency errors.

Figure 3:
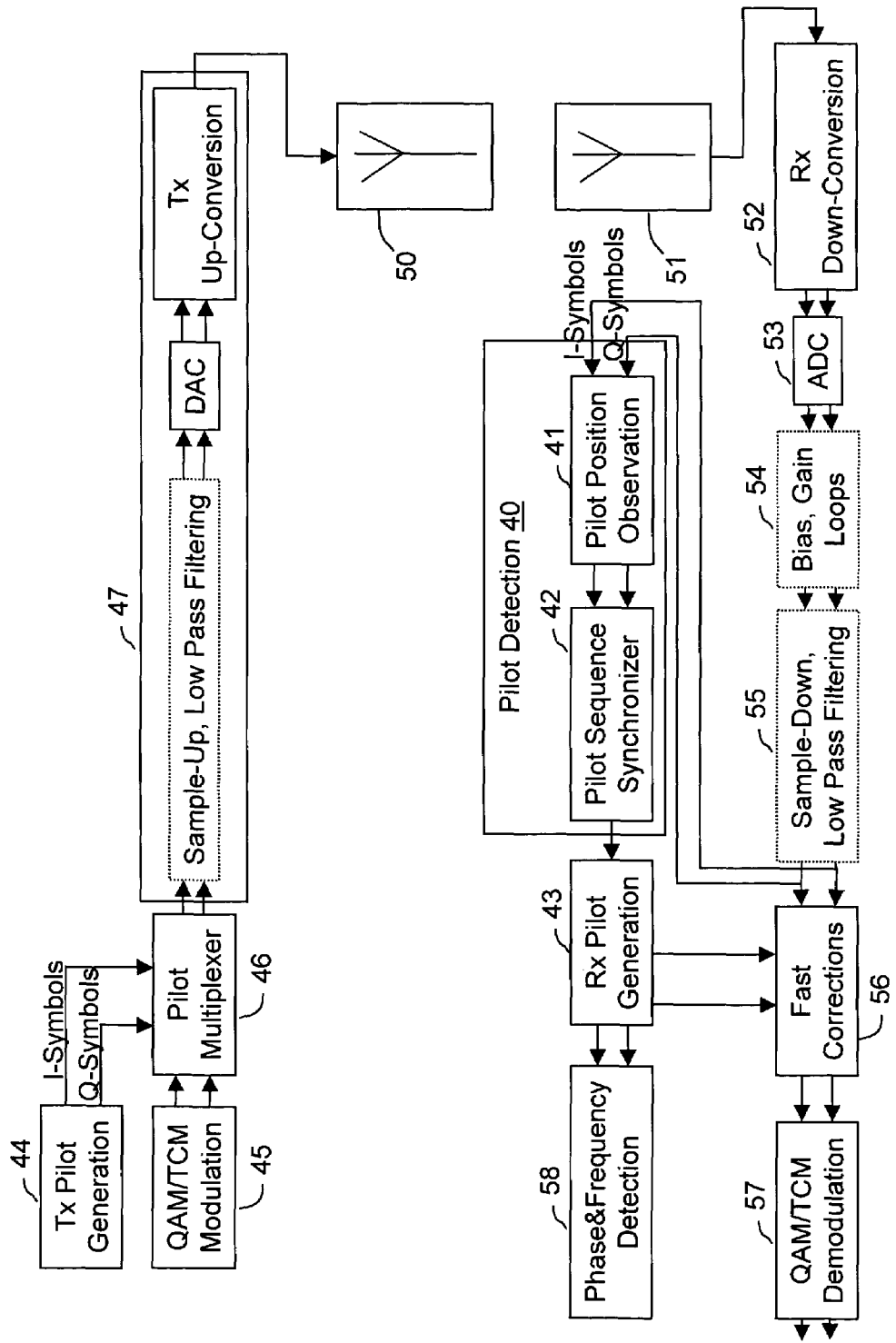
FIG. 3 shows a representative block diagram of a common single carrier system including a pilot detection principle according to certain embodiments of the present invention.

FIG. 3 shows a block diagram of a representative single carrier system with frame synchronization using pilot detection according to certain embodiments of the present invention. The framing is normally based on a periodically inserted pattern sequence of pilot symbols. Pilot detection is commonly a key process in digital receivers and is often responsible for the frame synchronization. The aim is generally to find the absolute position of a pattern sequence in received data.

Figure 4:
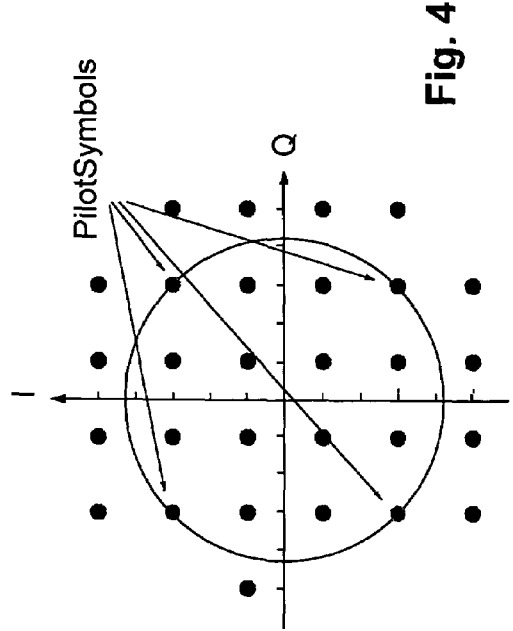
FIG. 4 shows an exemplary constellation diagram of TCM 32 modulated data symbols and QPSK modulated pilot symbols.

As shown in FIG. 3, a Tx (transmitter) pilot generation block 44 in a transmitter typically generates a predetermined pattern sequence of pilot symbols. The generation is usually based on PRBS (Pseudo Random Binary Sequences) bit sequences and/or additional QPSK (Quadrature Phase Shift Keying) modulation. In other words, in block 44 the generated PRBS bit sequences are normally QPSK modulated and/or QPSK modulated IQ (In-phase, Quadrature-phase) pilot symbols are typically output. Thus, as shown in FIG. 4, the pilot symbols commonly all have the same absolute amplitude value, but often differ in phase relation by, for example, 45°, 135°, 225° and/or 315°. In a QAM (Quadrature Amplitude Modulation)/TCM (Trellis Coded Modulation) modulation block 45, payload data is usually M-ary QAM or TCM modulated and M-ary QAM or TCM modulated IQ payload symbols normally are output.

Figure 5:
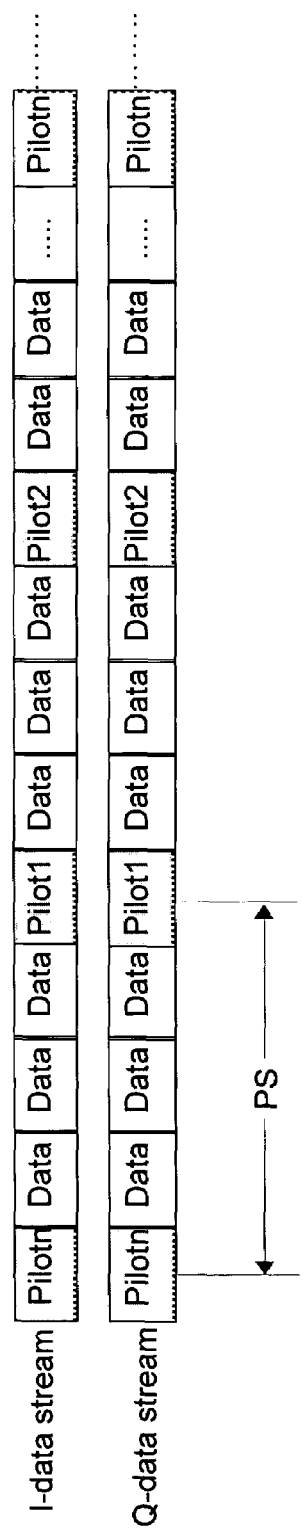
FIG. 5 shows a representative IQ data stream framing, generally realized by a periodically inserted predetermined pattern sequence of pilot symbols according to certain embodiments of the present invention.

In a pilot multiplexing block 46, the pilot symbols are frequently inserted equidistantly into the IQ payload symbol data stream, typically using adjustable, but generally constant, intervals PS (Pilot Spacing) between payload data symbols, as shown in FIG. 5. The periodically included pilot symbol pattern sequence is commonly used for framing of transmit and/or payload data, frame synchronization and/or detection of carrier-frequency and/or phase mismatches. The frame length is often defined by the PRBS length and/or PS. Before a transmission via an antenna 50, the data stream is generally passed through a block 47 to be sampled up, interpolated, low pass filtered and/or up-converted to the carrier frequency.

An Rx (Receiver) down-conversion block 52, typically in a receiver, usually down-converts the IQ data stream received by an antenna 51, the received IQ data stream normally including a payload and/or pilot symbol pattern sequence.

ADC (Analog/Digital converter), input data are often corrupted by certain errors such as, but not limited to, AWGN (Additive White Gaussian Noise), echo, carrier-frequency and carrier-phase mismatch, etc. In a block 54, errors in, for example, quadrature, balance, bias and/or gain, as well as, for example, echos on IQ symbols, are typically reduced. In a block 55, low pass filtering and/or down sampling usually follows.

IQ symbols input into a pilot detection block 40 are commonly pre-corrected by a CMA (Constant Modulus Algorithm) adaptive equalizer and/or other non-data-aided correction blocks (not shown). The pilot detection block 40 is frequently divided into two sub-blocks. The first sub-block is often a PPO (Pilot Position Observation) block 41, which routinely identifies the equidistant position of the pilot symbols on the received data stream.

Figure 6:
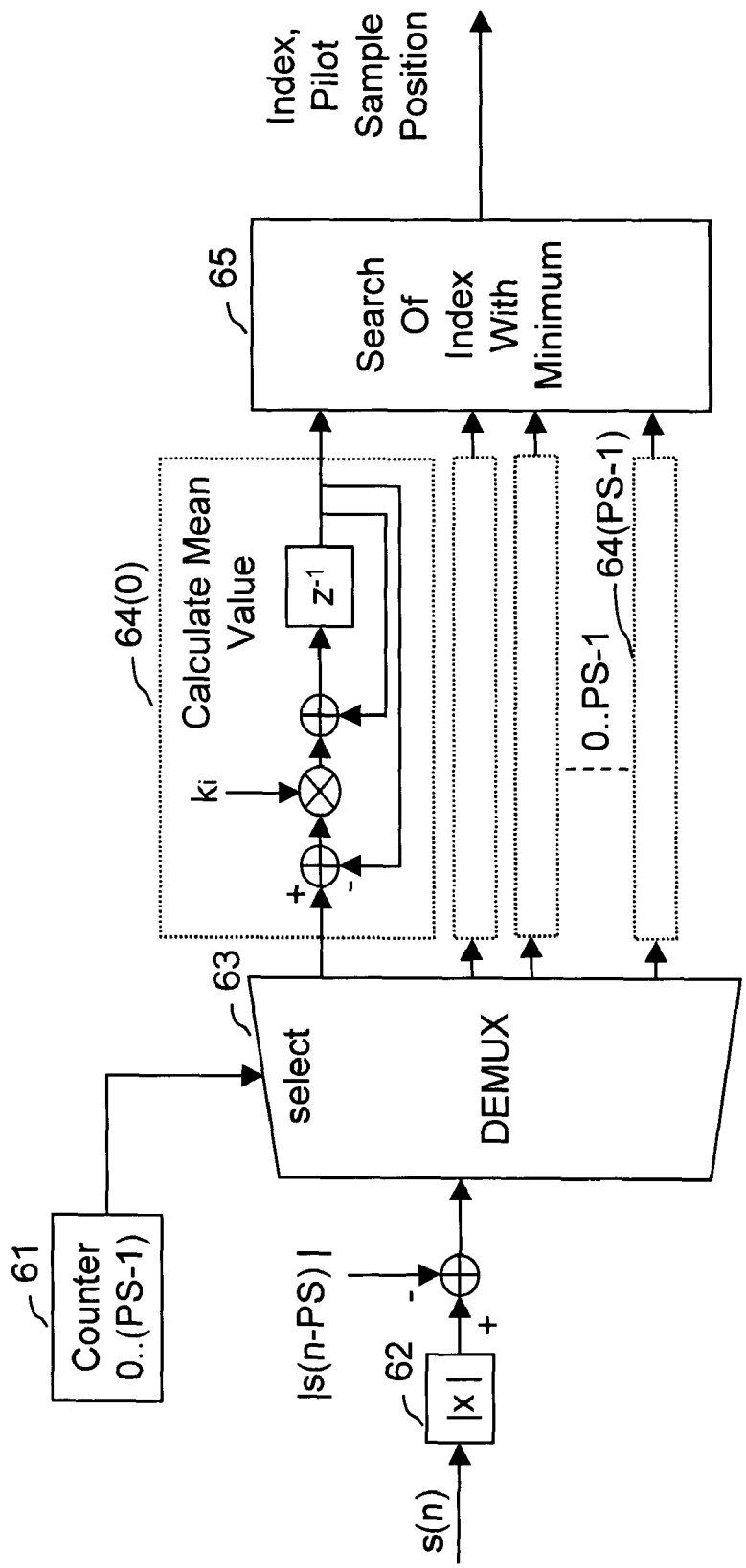
FIG. 6 shows an exemplary block diagram of a common pilot position observation block according to certain embodiments of the present invention.

The PPO block 41 normally identifies the equidistant position of the inserted pilot symbols (Pilot 1-Pilot n) in the received data stream, generally using the known pilot spacing and/or knowledge of the same absolute pilot symbol amplitude. FIG. 6 shows an exemplary block diagram of a representative embodiment of the PPO block 41. In block 62, the absolute value of symbols s(n) is normally calculated. Then, usually following block 62, a received symbol amplitude $|s(n-PS)|$, normally delayed by the pilot spacing PS, is commonly subtracted from a current symbol amplitude $|s(n)|$, and, usually subsequently in block 65, a minimum search is often performed.

Because of the generally constant pilot symbol amplitude and/or uniformly distributed data symbol amplitude, this subtraction $|s(n)|-|s(n-PS)|$ normally results periodically in a minimum with PS distance. Taking the demultiplexing in block 63 with a selection by a counter 61 into account, the pilot position is commonly given as the index of an accumulator 64 with minimum result. The robustness of the PPO block 41 may further be improved by requiring N consecutive minimum positions to be identical.

The PPO block 41 generally marks the pilots in the data stream and typically enables a second sub-block, for example, a Pilot Sequence Synchronizer PSS 42. In other words, if the pilot symbol position has been found by the PPO block 41, the PSS 42 is commonly enabled and the correlation procedure normally starts. The PSS 42 is often the second sub-block of the pilot detection block 40, which routinely synchronizes the received pattern sequence and/or a reference pattern sequence.

The task of the PSS 42 is normally to find the frame structure in the received data stream, typically by correlation of the received pattern sequence (second pattern sequence) of pilot symbols with the in-the-receiver known reference pattern sequence (first pattern sequence) of pilot symbols, usually according to the scheme described in connection with FIGS. 1 and 2 and equations (4) to (6). If the frame is found, the PSS commonly enables an Rx pilot generating block 43, which typically generates the same pattern sequence of pilot symbols as included in the transmitter. The generated pilot symbol sequence is generally synchronized with the received data and may be used by following fast data aided error detector blocks 56 and 58. These blocks normally compare the generated pilot symbol pattern sequence with the received pilot symbol pattern sequence, usually for further error calculations. After the fast corrections block 56, the data symbols are commonly subjected to a QAM/TCM demodulation in block 57.

As described above, the frame structure detection is routinely done in the PSS 42, typically by correlation of the DPV (Differential Phase Vector) sequences, generally calculated out of the received s(n) and reference r(k) pattern sequences of pilot symbols. The reference sequence of pilot symbols is not necessarily of the same length as the transmitted pattern sequence of pilot symbols, as shown in FIG. 7. However it is usually highly preferred and sometimes even required that the reference pattern exists only one time in the complete transmitted pattern sequence of pilot symbols to avoid multiple detection in one frame. The length Z of the reference pattern sequence is normally adjustable, as well as a length P of the pattern sequence included in the transmitter.

As described in connection with equations (4) to (6), the DPV is routinely given as a conjugate complex multiplication of two consecutive pilot symbols. This will commonly be done on the received pattern sequence of pilot symbols and/or the reference pattern sequence of pilot symbols. The permanently calculated DPV sequence of received data is typically correlated with the DPV sequence of the reference pattern sequence of pilot symbols. In case the received pilot sequence and the reference pattern sequence match, the absolute value of the DPV correlation generally results in a maximum. Frame detection is usually successful if this is detected in constant expected periodical distances. An internal state machine normally observes the number of the correct in periodical distance calculated maxima. In case the desired number of consecutive maxima is reached, the following blocks (in other words, blocks 43, 56, 57, 58 in FIG. 3) in the receiver chain are usually enabled.

In case of carrier-frequency mismatch of transmitter and receiver, which is often one of the major errors in radio transceiver systems, the DQPSK-based pilot detection routinely shows much higher robustness to this error than conventional techniques. Moreover, as may be seen from equation (12), the pilot detection block 40 often also delivers the constant carrier-frequency mismatch as the phase angle of the correlation result. Based on synchronized received and/or reference pilots, the calculation of an IQ phase shift is typically enabled. Furthermore, data-aided IQ amplitude error detectors are generally able to use this information. Possible error detectors include, but are not limited to, fast-carrier frequency, bias, quadrature, imbalance and/or inter-symbol interference detectors.

As described above, the correlation technique based on DPV (Differential Phase Vector) correlation is normally very robust to carrier-frequency error while commonly maintaining good correlation and/or cross-correlation properties. The transmitter/receiver carrier-frequency mismatch generally has, at least up to a certain limit, nearly no impact on the DPV technique, usually because of using pilot-to-pilot differential phase information. In the correlation result, the error is typically seen only as a phase shift. The absolute value, the correlation peak value, is normally not affected. The tolerable range of the carrier-frequency error is commonly only limited by the symbol rate input to the pilot detection block 40, the PS and/or the pilot-to-pilot ideal 90° phase shift.

The correlation technique based on the DPV correlation may normally be implemented in an ASIC (Application-Specific Integrated Circuit) and/or as a software code in a DSP (Digital Signal Processor).

According to certain embodiments of the present invention, a pattern sequence detection is often improved by allowing a very high carrier-frequency mismatch compared with the conventional correlation technique. Moreover, the synchronization time for synchronizing the first and second pattern sequences may be reduced. In particular, a pattern sequence detection of pilot symbols in a received data stream may be improved and/or the synchronization time of the whole receiver may be reduced.

In the following, simulation results, generally derived from the conventional correlation technique and/or the DPV correlation technique according to certain embodiments of the present invention are presented.

The simulation scenarios are usually done for the known Pilot Vector (PV) correlation approach and the Differential Phase Vector (DPV) correlation approach according to certain embodiments of the present invention. The simulation environment for the comparison routinely is:

Carrier-frequency mismatch up to 450 kHz
Data modulation scheme QAM16
Pilot symbol reference pattern sequence length=32 pilot symbols
Pilot symbol pattern sequence length inserted in transmit data stream=2047
Symbol rate fs=9.425 MHz
Pilot Spacing PS=9
Pilot symbol amplitude=$|0.719176+j0.719176|^2$ Out of these settings generally follows that the correlation maxima commonly has to be seen at a periodical distance:

$$\text{Period}=PS \cdot \text{TransmitPatternSequenceLength}=9 \cdot 2047=18423 \quad (15)$$

According to certain embodiments, the ideal correlation maxima value has to be, in the case of PV correlation:

$$|\text{corr}_{PVmax}|^2=1100, \quad (16)$$

And, in the case of DPV correlation, the correlation maxima usually is:

$$|\text{corr}_{DPVmax}|^2=1100 \quad (17)$$

Figure 13:
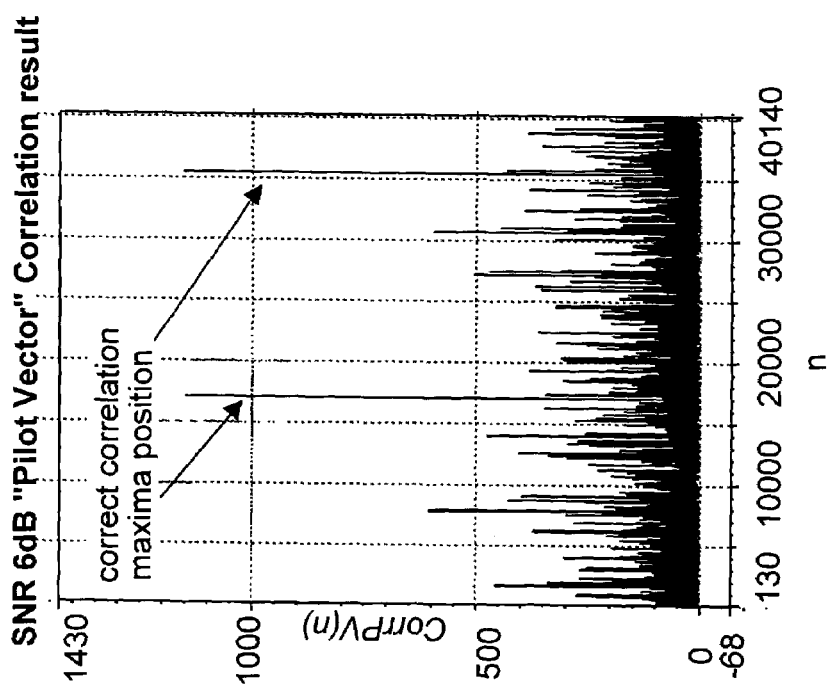

FIG. 13 shows exemplary simulation results of the known PV correlation approach with AWGN and an SNR (Signal to Noise Ratio) of 6 dB. In the case of AWGN, the correlation maxima value typically changes. With respect to what may be considered ideal correlation results according to certain embodiments of the present invention, the correlation maximum difference between the correlation maxima (for example, n=17128, n=35551) and/or the other correlation results (for example, n≠17128, n≠35551) normally decreases in case of noise, but the peaks are generally well detectable.

According to FIG. 13, the maxima are usually visible at n=17128 and n=35551. Thus, the periodic sequence is generally detected at the desired positions, usually with constant period. According to certain embodiments of the present invention, it is highly and, sometimes, most important that the correlation maxima be seen at the expected positions and with constant period.

Figure 14:
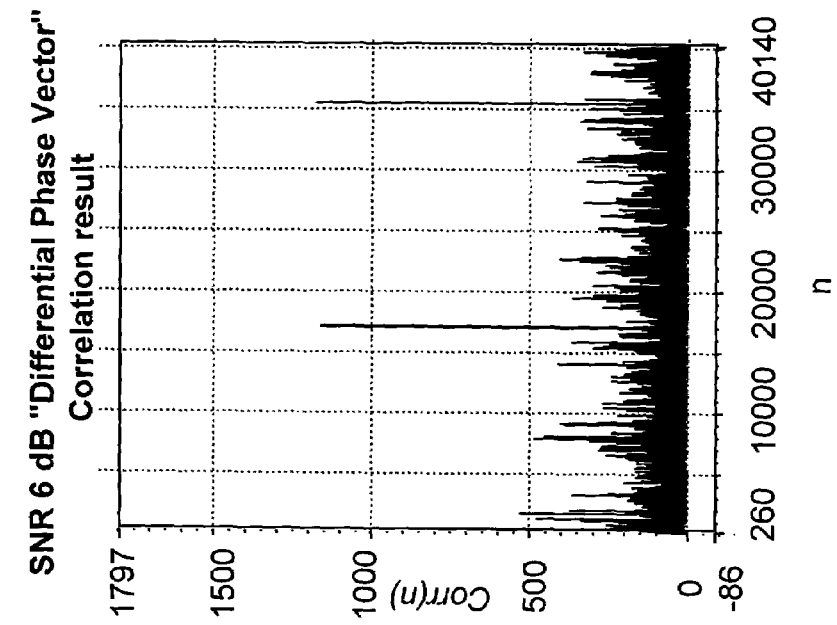

FIG. 14 shows the representative correlation results for the Differential Phase Vector correlation approach with AWGN and an SNR of 6 dB. Compared to what is considered by certain embodiments to be the ideal case, the correlation maxima difference in the case of AWGN decreases, as in, for example, the PV correlation case shown in FIG. 13. Nevertheless, the typical correlation maxima positions, as well as the typical maxima period, is given in both cases.

The next simulation scenarios commonly include carrier-frequency mismatch. The normally expected maximum working range for the Pilot Vector correlation approach is typically assumed up to nearly 16 to 18 kHz. Simulation results for both approaches, in other words, with carrier-frequency mismatch and AWGN, will be presented up to 450 kHz.

In the case of only carrier-frequency mismatch, the PV correlation result normally decreases significantly. Furthermore, as shown in FIG. 15, in case of additional AWGN of SNR=6 db, the result is commonly decreased again, but is often sufficient enough. The maxima positions and period are normally as expected, and, thus, the desired functionality is typically achieved.

For the DPV correlation approach, at least in the case of carrier-frequency mismatch, the correlation maxima are commonly the same as in what is often referred to as the ideal case, as described in connection with equations (4) to (6) above.

As shown in FIG. 16, the difference from the correlation maxima to other correlation results, at least in the case of AWGN at SNR=6 dB, is typically decreased. The maxima are, at least for this example, at the expected positions and period. The comparison of the simulation results of both approaches shows that the DPV approach generally delivers the better performance. The peaks are commonly much more detectable and/or the frequency error usually has little or no impact on the correlation result.

FIG. 17 shows a simulation result of the PV approach in the representative case of a 21 kHz carrier-frequency mismatch with additional AWGN with an SNR of 6 dB. The correlation maxima according to this example are not found at the expected position and period. The simulation result in this example shows that the performance of the PV approach is often not efficient enough to find the pilot symbol sequence. As shown, the tolerable carrier-frequency mismatch limit is exceeded. A similar simulation result is usually also achieved without the additional AWGN.

FIG. 18 shows clearly at least one advantage of the Differential Phase Vector approach according to certain embodiments of the present invention.

Even in the case where the carrier-frequency mismatch incredibly increases up to 450 kHz, the simulation results of the DPV correlation with and without AWGN usually show a good performance. The correlation maxima and period are, in both cases, usually as expected. The difference from the correlation maxima to the other correlation results is also generally as expected. Hence, the simulation result generally confirms the theoretical calculated ability of the DPV correlation approach to tolerate higher carrier-frequency mismatches.

According to certain embodiments, the present invention provides a differential phase vector based pilot sequence synchronization and, thus, pilot detection technique. At least one technique of certain embodiments of the present invention has been generally proven by comparison with the known pilot vector correlation approach.

Simulations illustrated in FIGS. 13 to 18 generally illustrate the better performance in the case of carrier-frequency mismatch and/or additional AWGN, at least as compared to the Pilot Vector approach. The impact of common carrier-frequency mismatch has been calculated and shown by simulations. By using the differential phase information, the frame synchronization technique typically works much better in the case of constant frequency errors than conventional techniques. The impact of constant frequency error is usually completely removed.

It is to be understood that the above description is illustrative of certain embodiments of the present invention and is not to be construed as limiting the invention. Various modifications and applications may occur to those skilled in the art without departing from the true spirit and scope of the invention, as defined by the appended claims.

We claim:

1. A method, comprising:
   performing a first calculation of calculating a complex product of two adjacent symbols of a first pattern sequence, the symbols comprising amplitude and phase information, thereby obtaining a first differential phase information sequence;

performing a second calculation of calculating a complex product of two adjacent symbols of a second pattern sequence, the symbols comprising amplitude and phase information, thereby obtaining a second differential phase information sequence;

correlating the first and second differential phase information sequences, thereby obtaining a correlation result; and determining a synchronization between the first and second pattern sequences based on the obtained correlation result.

2. The method according to claim 1, wherein in the first calculation a predetermined number Z of symbols of the first pattern sequence are used two at a time to calculate the complex product;

in the second calculation Z symbols 1 to Z of the second pattern sequence are used two at a time to calculate the complex product; and the second calculation and correlation are repeated and wherein, for each repetition m in the second calculation, the predetermined number Z of symbols is shifted by one symbol so that Z symbols 1+m to Z+m of the second pattern sequence are used two at a time to calculate the complex product.

3. The method according to claim 1, wherein phase information due to a mismatch of frequency information between the symbols of the first pattern sequence and the symbols of the second pattern sequence is detected based on the correlation result.

4. The method according to claim 1, wherein the symbols of the second pattern sequence are contained in a data symbol stream and are modulated in a different way from the data symbols in the data symbol stream, and wherein the method further comprises:

detecting the symbols of the second pattern sequence in the data symbol stream based on the different modulation.

5. The method according to claim 1, wherein, in the determining, the second pattern sequence is received by a receiving device from a transmitting device, and the first pattern sequence forms at least a part of the second pattern sequence and is stored in the receiving device.

6. The method according to claim 1, wherein, in the determining, the second pattern sequence comprises a sequence of IQ pilot symbols which are contained in a received data symbol stream and the first pattern sequence comprises a reference pattern sequence of IQ pilot symbols.

7. The method according to claim 6, wherein, in the determining, the IQ pilot symbols comprise quadrature phase shift keying (QPSK) modulated symbols, and the IQ pilot symbols of the second pattern sequence are periodically inserted into the data symbol stream at the transmitting device.

8. The method according to claim 1, wherein, in the determining, the second pattern sequence comprises a training sequence.

9. An apparatus, comprising:

first means for calculating a complex product of two adjacent symbols of a first pattern sequence, the symbols comprising amplitude and phase information, and outputting a first differential phase information sequence;

second means for calculating a complex product of two adjacent symbols of a second pattern sequence, the symbols comprising amplitude and phase information, and outputting a second differential phase information sequence;

third means for correlating the first and second differential phase information sequences, and outputting a correlation result; and means for determining a synchronization between the first and second pattern sequences based on the correlation result.

10. The apparatus according to claim 9, wherein the first means are configured for calculating the complex product for a predetermined number Z of symbols of the first pattern sequence two at a time;

the second means are configured for calculating the complex product for Z symbols 1 to Z of the second pattern sequence two at a time; and the second and third means are configured for repeating the operations; the apparatus further comprising:

shifting means for shifting, for each repetition m, the predetermined number Z of symbols in the second means by one symbol so that Z symbols 1+m to Z+m of the second pattern sequence are used two at a time for calculating the complex product.

11. The apparatus according to claim 9, further comprising:

means for detecting phase information due to a mismatch of frequency information between the symbols of the first pattern sequence and the symbols of the second pattern sequence from the correlation result output by the third means.

12. The apparatus according to claim 9, further comprising:

storing means for storing the first pattern sequence.

13. The apparatus according to claim 9, further comprising:

means for detecting the symbols of the second pattern sequence in a data symbol stream.

14. A system, comprising:

a transmitting device which includes:

means for generating symbols of a pattern sequence to be used for synchronization; and transmitting means for transmitting the symbols of the pattern sequence;

and a receiving device which includes:

first means for calculating a complex product of two adjacent symbols of a reference pattern sequence, the symbols comprising amplitude and phase information, and outputting a first differential phase information sequence;

receiving means for receiving the symbols of the pattern sequence transmitted by the transmitting device;

second means for calculating a complex product of two adjacent received symbols of the pattern sequence, the symbols comprising amplitude and phase information, and outputting a second differential phase information sequence;

third means for correlating the first and second differential phase information sequences, and outputting a correlation result; and means for determining a synchronization between the received and reference pattern sequences based on the correlation result.

15. The system according to claim 14, said transmitting device further comprising:

first modulation means for modulating data of the pattern sequence to be used for synchronization, according to a first modulation scheme, thereby providing the symbols of the pattern sequence;

second modulation means for modulating payload data according to a second modulation scheme, thereby providing a data symbol stream; and means for inserting the symbols of the pattern sequence into the data symbol stream.

16. The system according to claim 15, wherein the first modulation means are configured to modulate the data of the pattern sequence according to quadrature phase shift keying (QPSK) modulation scheme, and the second modulation means are arranged to modulate the payload data quadrature amplitude modulation (QAM) or Trellis coded modulation (TCM) modulation scheme.

17. The system according to claim 15, wherein the inserting means are arranged to insert the quadrature phase shift keying (QPSK) modulated symbols periodically into the quadrature amplitude modulation (QAM) or Tellis coded modulation (TCM) modulated data symbol stream.

18. A computer program embodied on a computer readable medium, comprising software code portions for performing a method comprising:
- a first calculation of calculating a complex product of two adjacent symbols of a first pattern sequence, the symbols comprising amplitude and phase information, thereby obtaining a first differential phase information sequence;
- a second calculation of calculating a complex product of two adjacent symbols of a second pattern sequence, the symbols comprising amplitude and phase information, thereby obtaining a second differential phase information sequence;
- correlating the first and second differential phase information sequences, thereby obtaining a correlation result; and
- determining a synchronization between the first and second pattern sequences based on the obtained correlation result.

19. The computer program according to claim 18, wherein said computer readable medium is directly loadable into the internal memory of the computer.

20. A system, comprising:
- a transmitting device which includes:
  - a symbol generator configured to generate symbols of a pattern sequence to be used for synchronization; and
  - a transmitter configured to transmit symbols of the pattern sequence;
- and a receiving device which includes:
  - a first processor configured to calculate a complex product of two adjacent symbols of a reference pattern sequence, the symbols comprising amplitude and phase information, and outputting a first differential phase information sequence;
  - a receiver configured to receive the symbols of the pattern sequence transmitted by the transmitting device;
  - a second processor configured to calculate a complex product of two adjacent received symbols of the pattern sequence, the symbols comprising amplitude and phase information, and outputting a second differential phase information sequence;
  - a third processor configured to correlate the first and second differential phase information sequences, and output a correlation result; and
  - a fourth processor configured to determine a synchronization between the received and reference pattern sequences based on the correlation result.

21. The system according to claim 20, said transmitter further comprising:
- first modulator configured to modulate data of the pattern sequence to be used for synchronization, according to a first modulation scheme, and provide the symbols of the pattern sequence;
- second modulator configured to modulate payload data according to a second modulation scheme, and provide a data symbol stream; and
- an insertion unit configured to insert the symbols of the pattern sequence into the data symbol stream.

22. The system according to claim 20, wherein the first modulator is configured to modulate the data of the pattern sequence according to quadrature phase shift keying (QPSK) modulation scheme, and the second modulator is configured to modulate the payload data quadrature amplitude modulation (QAM) or Tellis coded modulation (TCM) modulation scheme.

23. The system according to claim 20, wherein the insertion unit is configured to insert the quadrature phase shift keying (QPSK) modulated symbols periodically into the quadrature amplitude modulation (QAM) or Tellis (TCM) modulated data symbol stream.

24. An apparatus, comprising:
- a first calculator configured to calculate a complex product of two adjacent symbols of a first pattern sequence, the symbols comprising amplitude and phase information, and output a first differential phase information sequence;
- a second calculator configured to calculate symbols of a second pattern sequence, the symbols comprising amplitude and phase information, and output a second differential phase information sequence;
- a correlator configured to correlate the first and second differential phase information sequences, and output a correlation result; and
- a synchronizer configured to determine a synchronization between the first and second pattern sequences based on the correlation result.

25. The apparatus according to claim 24, wherein
- the first calculator is configured to calculate the complex product for a predetermined number Z of symbols of the first pattern sequence two at a time;
- the second calculator is configured to calculate the complex product for Z symbols 1 to Z of the second pattern sequence two at a time; and
- the second calculator and correlators are configured to repeat the operations; the apparatus further comprising:
- a shifter configured to shift for each repetition m, the predetermined number Z of symbols in the second calculation unit by one symbol so that Z symbols 1+m to Z+m of the second pattern sequence are correlated two at a time.

26. The apparatus according to claim 24, further comprising:
- a detector configured to detect phase information due to a mismatch of frequency information between the symbols of the first pattern sequence and the symbols of the second pattern sequence from the correlation result output by the correlation unit.

27. The apparatus according to claim 24, further comprising:
- memory configured to store the first pattern sequence.

28. The apparatus according to claim 24, further comprising:
- a detector configured to detect the symbols of the second pattern sequence in a data symbol stream.

* * * * *